United States Patent [19]
Chang

[11] Patent Number: 5,857,489
[45] Date of Patent: Jan. 12, 1999

[54] CONTROL UNIT FOR HOT AND COLD WATER

[76] Inventor: Chia-Bo Chang, No. 335, Chang-Ting Road, Lukang, Changhua Hsien, Taiwan

[21] Appl. No.: 712,318

[22] Filed: Sep. 11, 1996

[51] Int. Cl.⁶ ............................................. F16K 11/074
[52] U.S. Cl. ................................. 137/625.17; 137/625.4
[58] Field of Search ...................... 137/625.17, 625.41, 137/625.4

[56] References Cited

U.S. PATENT DOCUMENTS

| | | | |
|---|---|---|---|
| 4,621,659 | 11/1986 | Pawelzik | 137/625.17 |
| 4,997,005 | 3/1991 | Pawelzik et al. | 137/625.17 |
| 5,080,134 | 1/1992 | Orlandi | 137/625.17 |
| 5,213,134 | 5/1993 | Orlandi | 137/625.17 X |
| 5,303,736 | 4/1994 | Orlandi | 137/625.17 X |
| 5,329,958 | 7/1994 | Bosio | 137/625.17 X |
| 5,417,242 | 5/1995 | Goncze | 137/625.17 |

*Primary Examiner*—John Rivell
*Attorney, Agent, or Firm*—Beveridge, DeGrandi, Weilacher & Young, LLP

[57] ABSTRACT

A control unit for a hot and cold water mixer that includes one cartridge, one movable disc, one fixed disc, and one valve seat. Within the structure, the first and second openings and the third shell shape opening of the fixed disc will provide the maximum area of water flow in conjunction with the enlarged area of the mixing chamber of the movable disc. The unit will increase the water flow of the valve and will facilitate the transporting capability of a more uniform temperature water. In addition, the cartridge structure may, for any purposes, assemble various connecting pipe lengths or specifications to the valve seat and may form the desired specification as well as reduces the production cost of cartridge molds.

17 Claims, 5 Drawing Sheets

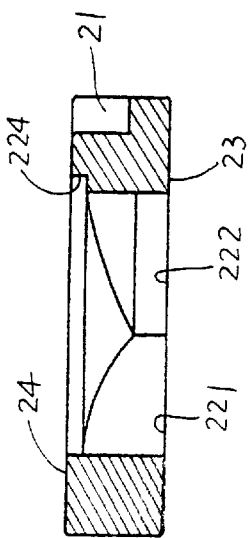
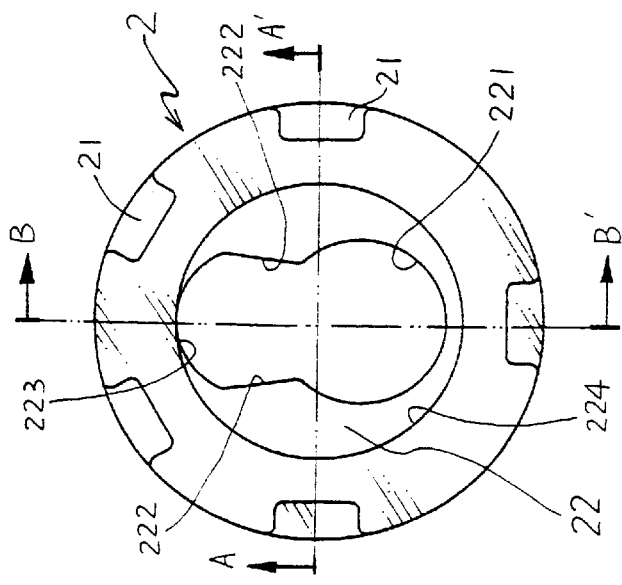
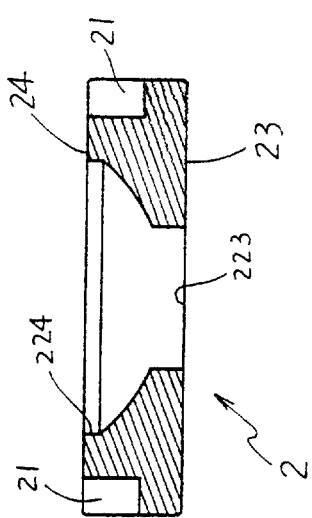
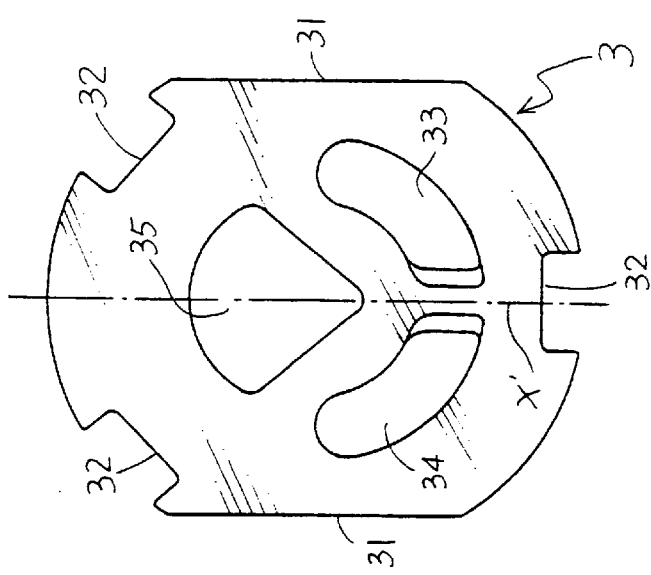
FIG. 4A
FIG. 4C
FIG. 4B
FIG. 3

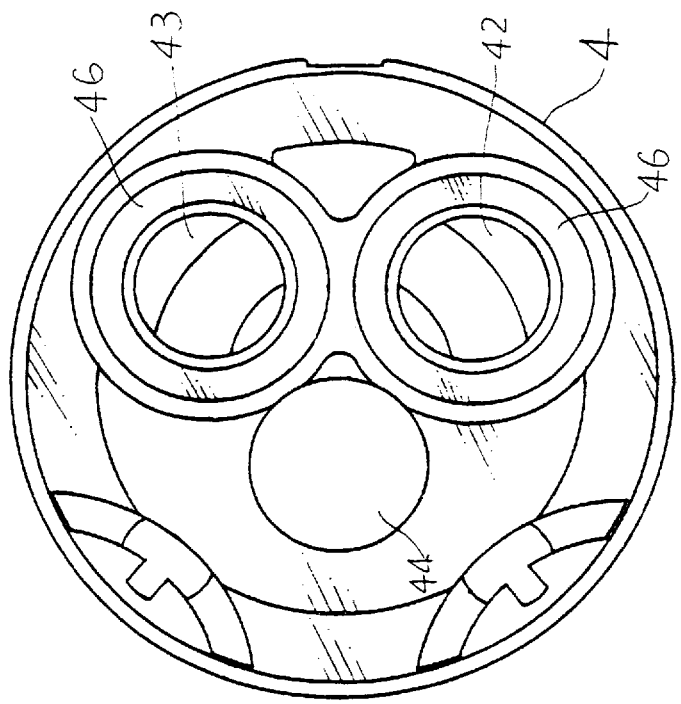
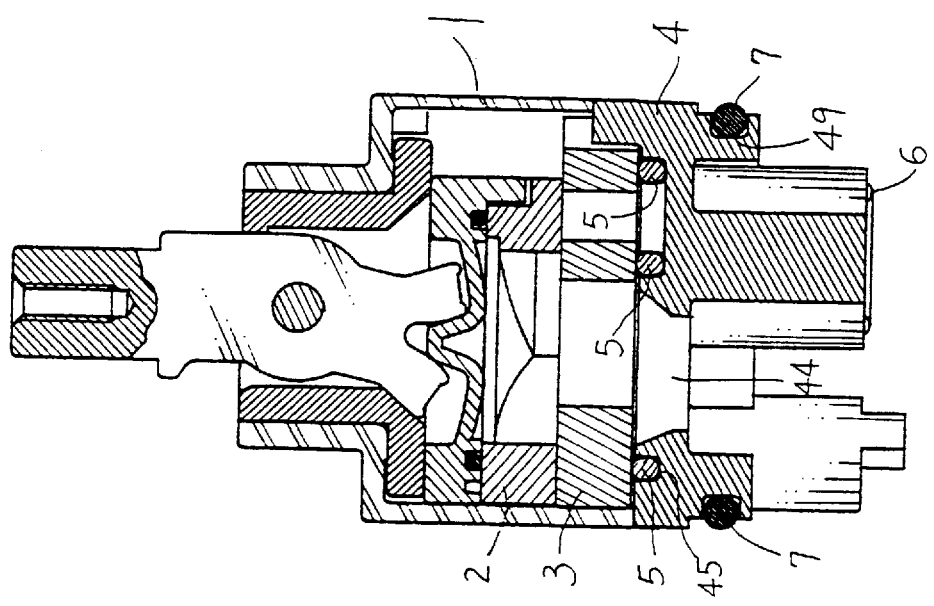
FIG. 7B
FIG. 7A 5,857,489

CONTROL UNIT FOR HOT AND COLD WATER

BACKGROUND OF THE INVENTION

The invention is related to the control valve unit for mixing and transporting cold and hot water, a novel cartridge-type control valve unit, especially within the improving structure of the control unit and cartridge unit.

The common cartridge types of control valve units for hot and cold water consist of two overlapping ceramic plates and a cartridge cover connected to an extending outward control rod. Generally speaking, the entire structure of the control vavle is mounted on the control unit of the water tap as well as divides the inlet pipe of hot and cold water and connects the outlet of a water tap by the preset water flow opening on the cartridge bottom, and is further capable of mixing and transporting hot and cold water.

The cartridge has one fixed disc and one movable disc. The later one is driven by a control rod and moves on the fixed disc, which is positioned over the two water flow inlet openings, which may connect to pipes of hot and cold water, and an additional water flow outlet to transport water to the outlet. Also, the movable disc may match the fixed disc to provide the mixed space and alternately, to connect either one or two inlets to the outlet. However, with the inlets and outlet connecting through the overlapping plate, it is difficult to provide an ideal volume and avoid a deficient mixture of cold and hot water. Although someone has improved the disc to be a larger diameter in order to enlarge the inlet or outlet of water flow, the fixed specification and the size of general cartridges fail to further enlarge the diameter.

Also, due to being subjected to different installations, the specifications of water taps and the water feeding control valves of water taps vary accordingly in their requirement, for instance, among some control units of water taps, distances between the control valve device and the inlets or outlet often have more than two different spacings or lengths. The connecting pipe of the conventional control valve is a monobloc casting as well as being equipped under the cartridge, then the manufacturer should open various sets of cartridge molds to produce similar products which will increase additional costs.

SUMMARY OF THE INVENTION

The unit provides optimal volume and improve water delivery control to facilitate the efficient mixing of hot and cold water. By altering shapes and enlarging the area of the inlets and outlet for water flow and utilizing the larger area of the mixing chamber of the movable disc, the invention will not modify specifications of outer diameters of the fixed and movable disc, moreover it will increase water flow volume of the control valve and will utilize the larger area of the mixing chamber of the movable disc to provide sufficient mixing space and deliver an uniform temperature of hot and cold water flow.

One of the purposes of the invention lets the control valve seat be attached to different length and spacing of connecting pipes and improve the control unit of mixing hot and cold water as well as modify the assembly structure of the cartridge with adding different length specification of connecting pipes to the control valve bottom. This meets the required specification of the control valve and reduces the production costs of opening the cartridge molds.

BRIEF DESCRIPTION OF THE DRAWINGS

FIG. 3 is a top view of the fixed disc;

FIG. 4A is a top view of the movable disc;

FIG. 4B is a sectional view taken along the line A—A' of FIG. 4A to depict the horizontal cross-section view of the movable disc;

FIG. 4C is a sectional view taken along the line B—B' of FIG. 4A to depict the vertical cross-section view of the movable disc;

FIG. 7A is a sectional view of parts of the control valve seat after assembling longer pipes; and FIG. 7B is a bottom view of parts of the control valve seat in FIG. 7A.

DETAILED DESCRIPTION OF THE PREFERRED EMBODIMENT

Figure 2:
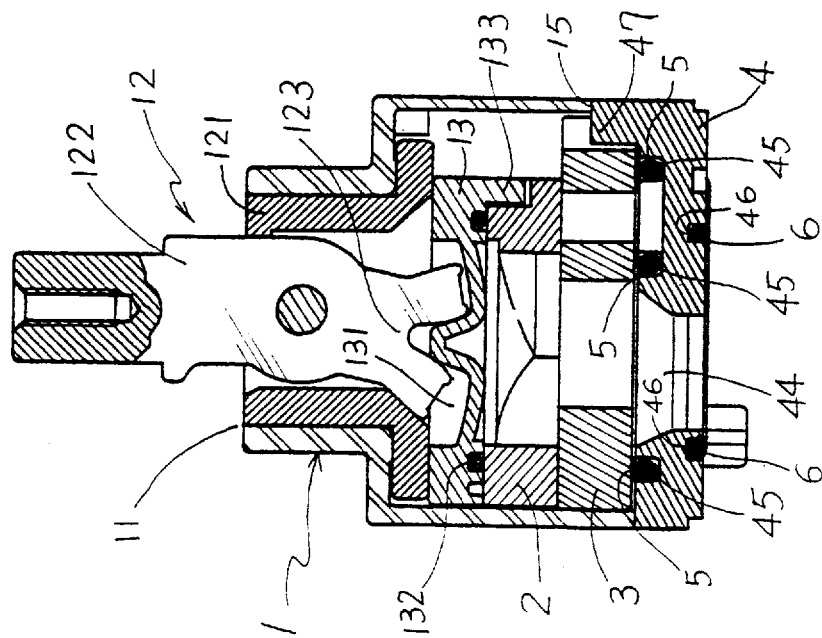
FIG. 2 is a cross-section view of the structure of related parts of the entire unit shown in FIG. 1.
Figure 1:
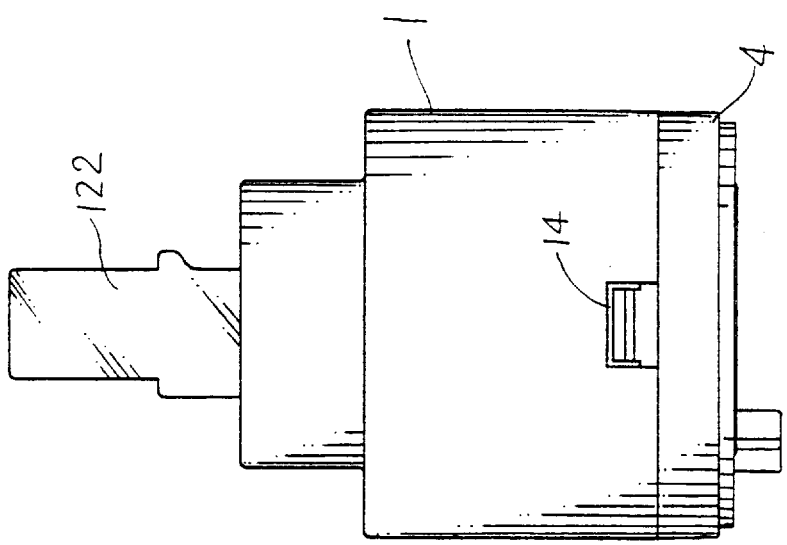
FIG. 1 is a side view of the cartridge unit of the preferred embodiment.
Figure 5A:
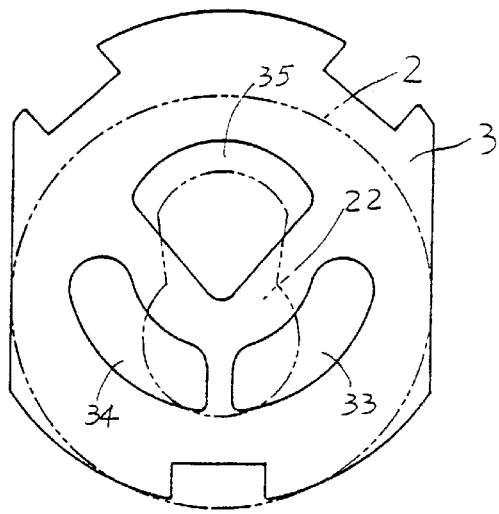
FIG. 5A is a top view of the position where the movable disc is on the fixed disc to depict the mixing state of a full opening of both hot and cold water.
Figure 5B:
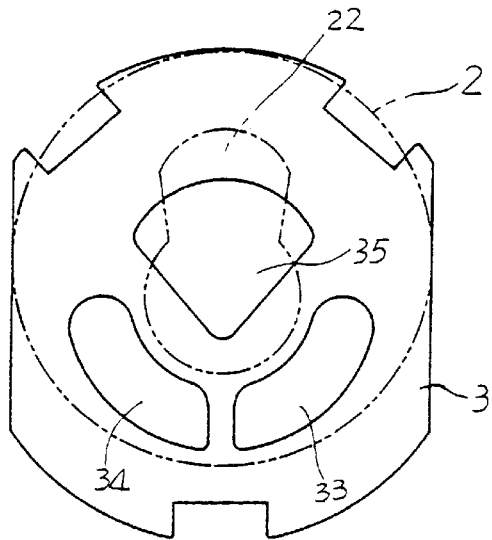
FIG. 5B is a top view of the position where the movable disc is on the fixed disc to depict one of the closure states of the control valve.
Figure 5C:
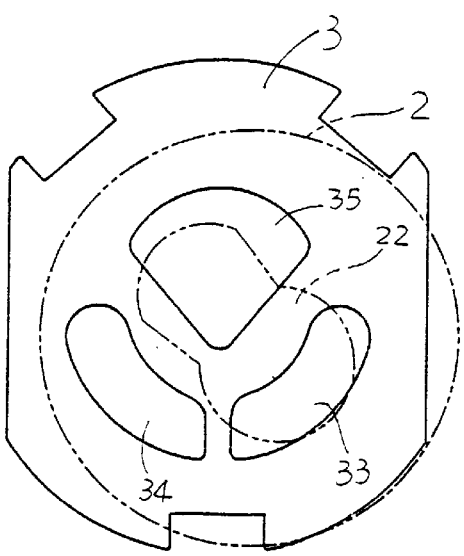
FIG. 5C is a top view of the position where the movable disc is on the fixed disc to depict the delivery of a full opening of both hot and cold water.
Figure 5D:
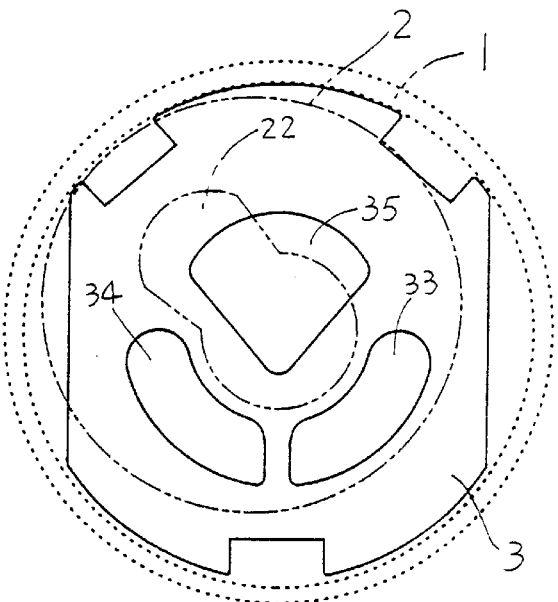
FIG. 5D is a top view of the position where the movable disc is on the fixed disc to depict another closure state of the control valve.

Referring to the attached drawings, the present invention generally includes a cartridge 1, a movable disc 2, a fixed disc 3 and a valve seat 4. The cartridge is cylindrical, on the top, there is a cavity of smaller diameter 11. A rotative control rod device 12 is inserted in the cavity. The control rod device 12 swings through the central axis of a cover seat 121, and includes a control rod 122 extending outward from the cover seat 121 and a fork 123 beneath the lower part of the control rod 122. The bottom of the control rod device 12 connects to a rolling plate 13. A cavity 131 is on the top of the rolling plate 13 to engage the fork 123 of the aforesaid control rod 122. The rolling plate 13 provides a range of motion for the control rod 12. An O-ring 132 is beneath the rolling pate 13. The rolling plate 13 is equipped with a check pawl 133 extending downward. There are also two let-in cavities 14 and a positioning groove 15 symmetrically corresponding to the bottom of the cartridge 1 for attaching the valve seat 4.

Referring to FIGS. 4A, 4B and 4C, the movable disc 2 is a smaller diameter than the aforesaid cartridge 1. There are several cavities 21 on the periphery of the movable disc 2 corresponding to the position of the check pawl 133 of the rolling plate 13. The movable disc 2 is able to be inserted into the rolling plate 13 and to be mounted on the cartridge 1 while moving freely relative to the fixed disc 3. Also, there is a mixing chamber 22 in the movable disc 2. The overlapping surface 23 between the mixing chamber and the shape of the fixed disc 3 form an eccentric circle 221, close to the center of the movable disc 2 and crossing over the side of two symmetrically extending outward lines 222, which are similar to a sine wave. Further the end of the two lines 222 connect an arc line 223 and form an area. The area extends into the overlapping surface 23 of the movable disc 2 and connects the relative surface 24. The area has a keyhole shape bottom to interface with the fixed disc 3. The mixing chamber forms a right circle at the top of movable disc 2. After the movable disc 2 and the rolling plate 13 are inserted and assembled, then the O-ring 132 of the rolling plate encircles and seals the formed right circle 224.

Referring to FIG. 3, the diameter of the fixed disc 3 is equal to the diameter of the round plate of the cartridge 1. There is a chord tangent plane 31 on each side of the fixed disc 3. There are several positioning flutes 32 around the perimeter of the fixed disc 3. The fixed disc 3 overlaps the movable disc 2. The first opening 33 and the second opening 34 are symmetrical to each other and the third opening 35 is an inversive shell shape with respect to the margin of the movable disc 2. The third opening 35 aligns with the symmetrical axial lines of the first opening 33 and the second opening 34 as well as positioned on the centripetal direction able to extend outward.

Figure 6A:
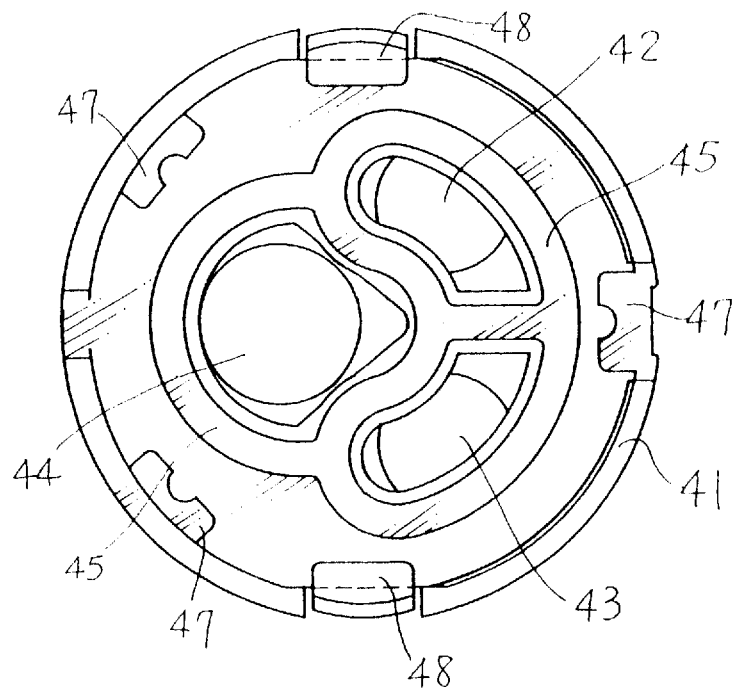
FIG. 6A is a top view of the control valve seat shown in FIG. 2.
Figure 6B:
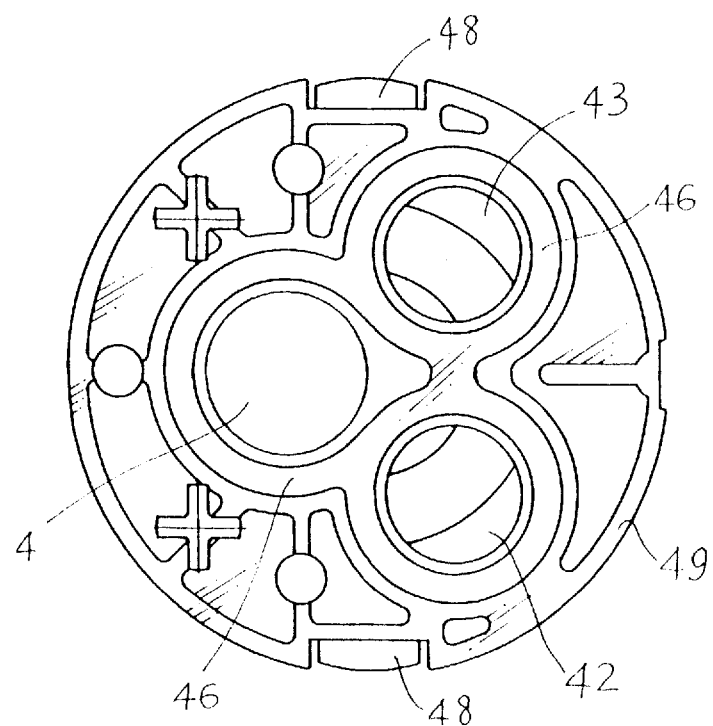
FIG. 6B is a bottom view of the control valve seat in FIG. 2.

Referring to FIGS. 2, 6A and 6B, they illustrate the valve seat 4 with the shorter connecting pipe. There are symmetrical pipes 42, 43, 44 connecting to the openings 33, 34, 35 of the fixed disc. There is a washer slot 45 encircling the top openings of pipes 42, 43, 44 and inserted into the washer slot 45 is an O-ring 5. The connecting pipes penetrate the valve seat 4 and run through the bottom to the relevant pipes of the water taps with a proper length of pipe. There is an O-ring slot 46 encircling the low part of pipes 42, 43, 44 and a rubber O-ring 6 inserted in the slot 46 to prevent the connection of the entire valve and the inlet and outlet from leaking. In addition, there are restricted lugs 47 extending upward on the margin of the valve seat corresponding to the positioning slots 32 of the fixed disc 3 and the positioning slot 15 of the cartridge 1. The let-in catches 48 provide the reason for the chord tangent planes 31. The let-in catches 48 of the valve seat 4 correspond to the let-in cavities 14 of the cartridge bottom 1, which together provide the connection between these two parts. The valve seat 4 is fixedly inserted into the bottom of the cartridge 1 and positions the fixed disc 3.

The valve seat 4 inserts and engages the bottom of the cartridge 1 and positions the fixed disc 3 in the cartridge. The movable disc 275 inserted into the rolling plate 13. The movable disc 2 is subjected to the movement of the control rod 12 and is able to move and overlap the fixed disc 3. The control rod 12 drives the movable disc 2 and alters various positions of the movable disc 2 in relation to the fixed disc 3 (see FIGS. 5A, 5B, 5C and 5D) at the same time. To provide for water flow, the mixing chamber 22 connects to either or both inlets and the outlet and is able to open or close or mix or deliver hot and cold water. Also, the invention utilizes the first and second openings 33, 34 and the third opening of shell shape 35 and provides the maximum area of water flow to match the larger area of the mixing chamber 22 of the movable disc 2 than the general mixing chamber in order to increase volume of water flow of the control valve and to transport a water flow having an uniform temperature.

Furthermore, the cartridge structure of the invention may connect to different length and specification pipes in order to form the required specification and reduce the production costs of the cartridge molds. FIGS. 7A and 7B illustrate that there are water flow pipes 42, 43, 44 on the top 41 of the valve seat 4 with longer connecting pipes to connect correspondingly to openings 33, 34, 35 of the fixed disc 3 and a washer slot 15 encircles the top openings of the water flow pipes and is equal in size to an O-ring 5 (see FIG. 6A). Two of these connecting inlet pipes 42, 43 run through the valve seat and extend downward with the proper length to the connecting pipes of the water taps. There is an O-ring slot 46 under the low opening of connecting pipes 42, 43 and the rubber O-ring 6 covers the O-ring slot 46. Also, there is a ring slot 49 around the walls of the valve seat and the rubber O-ring 7 covers it to prevent the entire valve seat with the inlets and the outlet from leakage. Also, the assembly of lugs 47 and let-in catches 48 are similar to the aforesaid valve seat 4 with shorter connecting pipes.

What the invention claimed is:

1. A control unit for mixing hot and cold water comprising:
   a cartridge having at least one position groove and two let-in cavities,
   a valve seat connected to said cartridge, said valve seat including:
      water flow connections,
      a plurality of lugs, at least one of said plurality of lugs engages said at least one position groove, and
      two let-in catches, each of said let-in catches engages a respective one of said two let-in cavities,
   a fixed disc connected to said valve seat, said fixed disc having
      a plurality of flutes passing therethrough such that each of said plurality of flutes engages a respective one of said plurality of lugs,
      a plurality of openings passing therethrough in communication with said water flow connections of said valve seat, and
      recessed peripheries to match said two let-in catches such that said fixed disc fits within said valve seat without impinging said two let-in catches,
   a movable disc adjacent to said fixed disc such that said movable disc slides over said fixed disc, said movable disc having a plurality of cavities and a mixing chamber in selective communication with said plurality of openings of said fixed disc depending on a relative position of said movable disc to said fixed disc,
   a rolling plate attached to said movable disc, said rolling plate including engagement cavities and a check pawl to engage said plurality of cavities of said movable disc, and
   a control rod having a fork engaging said engagement cavities of said rolling plate; and
   wherein said control rod moves said movable disc relative to said fixed disc during use to bring said mixing chamber into communication with at least two of said plurality of openings of said fixed disc to cause water to flow through said control unit.

2. The control unit according to claim 1, wherein there are three openings in said fixed disc and three water connections of said valve seat such that a first opening and a first water connection receives hot water, a second opening and a second water connection receives cold water, and a third opening and a third water connection are in communication with a faucet.

3. The control unit according to claim 2, wherein
   said first opening and said second opening are arcuate shape and symmetrical to each other about an axis located equal distance between and parallel to said recessed peripheries, and
   said third opening is bisected by and symmetrical about the axis.

4. The control unit according to claim 1, wherein said first opening and said second opening are arcuate shape and symmetrical to each other about an axis located equal distance between and parallel to said recessed peripheries, and said third opening is bisected by and symmetrical about the axis.

5. The control unit according to claim 1, wherein said mixing chamber passes completely through said movable disc.

6. The control unit according to claim 5, wherein said mixing chamber having an opening in communication with said plurality of openings of said fixed disc in the shape of a keyhole with a circular end connected through divergent lines with an arcuate end.

7. The control unit according to claim 5, wherein an opening of said mixing chamber in communication with said rolling plate is circular.

8. The control unit according to claim 7, wherein said mixing chamber having an opening in communication with said plurality of openings of said fixed disc in the shape of a keyhole with a circular end connected through divergent lines with an arcuate end.

9. The control unit according to claim 1, further comprising a first O-ring between said valve seat and said fixed disc, and a second O-ring between said movable disc and said rolling plate.

10. The control unit according to claim 1, wherein said mixing chamber having an opening in communication with said plurality of openings of said fixed disc in the shape of a keyhole with a circular end connected through divergent lines with an arcuate end.

11. The control unit according to claim 1, wherein said recessed peripheries of said fixed disc are straight parallel edges connecting two approximately arcuate ends, and said two approximately arcuate ends include said plurality of flutes.

12. The control unit according to claim 1, wherein said two let-in cavities are symmetrical to each other, and said two let-in catches are symmetrical to each other.

13. The control unit according to claim 12, wherein said two let-in catches each are an inverted L-shape member extending upward from said valve seat.

14. The control unit according to claim 12, wherein said two let-in cavities each are a recess in a side of said cartridge extending upward from a bottom periphery of said cartridge.

15. The control unit according to claim 1, wherein said two let-in catches each are an inverted L-shape member extending upward from said valve seat.

16. The control unit according to claim 1, wherein said two let-in cavities each are a recess in a side of said cartridge extending upward from a bottom periphery of said cartridge.

17. The control unit according to claim 1, wherein said cartridge includes a cylindrical bottom portion, said cylindrical bottom portion includes said two let-in cavities, a platform radially extending inwardly from said cylindrical bottom portion, and a cylindrical upper portion extending upwardly from said platform.

* * * * *